United States Patent
Ito

(10) Patent No.: US 12,271,837 B2
(45) Date of Patent: Apr. 8, 2025

(54) OPTIMIZATION APPARATUS, OPTIMIZATION METHOD AND NON-TRANSITORY COMPUTER-READABLE MEDIUM STORING OPTIMIZATION PROGRAM

(71) Applicant: NEC Corporation, Tokyo (JP)

(72) Inventor: Shinji Ito, Tokyo (JP)

(73) Assignee: NEC CORPORATION, Tokyo (JP)

(*) Notice: Subject to any disclaimer, the term of this patent is extended or adjusted under 35 U.S.C. 154(b) by 0 days.

(21) Appl. No.: 17/768,082

(22) PCT Filed: Oct. 24, 2019

(86) PCT No.: PCT/JP2019/041685
§ 371 (c)(1),
(2) Date: Apr. 11, 2022

(87) PCT Pub. No.: WO2021/079457
PCT Pub. Date: Apr. 29, 2021

(65) Prior Publication Data
US 2024/0095610 A1    Mar. 21, 2024

(51) Int. Cl.
*G06Q 10/04*    (2023.01)
*G06Q 30/0202*    (2023.01)

(52) U.S. Cl.
CPC ......... *G06Q 10/04* (2013.01); *G06Q 30/0202* (2013.01)

(58) Field of Classification Search
None
See application file for complete search history.

(56) References Cited

U.S. PATENT DOCUMENTS

| 8,000,996 | B1* | 8/2011 | Sanli | G06Q 30/02 |
| | | | | 705/7.35 |
| 2015/0120409 | A1* | 4/2015 | Bhattacharya | G06Q 30/0211 |
| | | | | 705/14.13 |
| 2019/0362374 | A1* | 11/2019 | Mungoli | G06Q 30/0223 |

FOREIGN PATENT DOCUMENTS

| JP | 2003248767 A | * | 9/2003 |
| JP | 2004185539 A | * | 7/2004 |
| WO | 2017/135322 A1 | | 8/2017 |
| WO | 2018/008303 A1 | | 1/2018 |

OTHER PUBLICATIONS

International Search Report for PCT Application No. PCT/JP2019/041685, mailed on Jan. 7, 2020.

(Continued)

*Primary Examiner* — Vincent M Cao
(74) *Attorney, Agent, or Firm* — Sughrue Mion, PLLC

(57) ABSTRACT

A purpose of the present invention is to achieve highly accurate optimization for a submodular function when a policy is optimized without preparing data for machine learning. An optimization apparatus (100) according to the present invention includes a determination unit (110) that determines one or more execution policies from a predetermined policy in an objective function having diminishing marginal utility and convexity, a reward acquisition unit (120) that acquires reward, which is an execution result in the objective function for the determined execution policy, a calculation unit (130) that calculates an update rate of the policy based on the reward, and an update unit (140) that updates the policy based on the update rate.

7 Claims, 4 Drawing Sheets

(56) References Cited

OTHER PUBLICATIONS

Hazan, E. et al., "Online Submodular Minimization", Oct. 2012, Journal of Machine Learning Research(JMLR), vol. 13, pp. 2903-2922, ISSN: 1533-7928, <URL:http://www.jmlr.org/papers/volume13/hazan12a/hazan12a.pdf>.

Ito, S. et al., "Large-Scale Price Optimization via Network Flow", Dec. 10, 2016, Proceedings of the 30th conference on Neural Information Processing Systems (NIPS 2016), pp. 1-9, <URL:https://papers.nips.cc/paper/6301-large-scale-price-optimization-via-network-flow.pdf>.

Han, S. et al., "Assortment Optimization and Submodularity", University of Pittsburgh, May 2019, pp. 1-15, <URL:http://pitt.edu/~agomez/publications/Assortment.pdf> and <URL:https://scholar.google.com/citations?user=6EbgGsAAAAAJ&hl=en>.

JP Office Action for JP Application No. 2021-553227, mailed on Jul. 4, 2023 with English Translation.

* cited by examiner

OPTIMIZATION APPARATUS, OPTIMIZATION METHOD AND NON-TRANSITORY COMPUTER-READABLE MEDIUM STORING OPTIMIZATION PROGRAM

This application is a National Stage Entry of PCT/JP2019/041685 filed on Oct. 24, 2019, the contents of all of which are incorporated herein by reference, in their entirety.

TECHNICAL FIELD

The present invention relates to an optimization apparatus, an optimization method, and an optimization program, and particularly to an optimization apparatus, an optimization method, and an optimization program for minimizing a submodular function.

BACKGROUND ART

There are known techniques for optimizing policies from past data using machine learning, such as optimization of product prices. Non Patent Literature 1 discloses a technique for online submodular minimization without using machine learning. Non Patent Literature 2 discloses a technique related to price optimization of a large number of products.

CITATION LIST

Non Patent Literature

Non Patent Literature 1: E. Hazan and S. Kale, Online submodular minimization, Journal of Machine Learning Research, 327 13 (October):2903-2922, 2012.
Non Patent Literature 2: S. Ito and R. Fujimaki, Large-scale price optimization via network flow, [online], Dec. 5, 2016, [searched on Oct. 18, 2019], Internet <URL: https://papers.nips.cc/paper/6301-large-scale-price-optimization-via-network-flow.pdf>

SUMMARY OF INVENTION

Technical Problem

In order to optimize policies without preparing data for machine learning, the accuracy of Non Patent Literature 1 has been insufficient.

The present disclosure has been made to solve such a problem, and a purpose of the present disclosure is to provide an optimization apparatus, an optimization method, and an optimization program that achieve highly accurate optimization for a submodular function.

Solution to Problem

An optimization apparatus according to a first aspect of the present disclosure includes:
 a determination means for determining one or more execution policies from a predetermined policy in an objective function having diminishing marginal utility and convexity;
 a reward acquisition means for acquiring a reward, the reward being an execution result in the objective function for the determined execution policy;
 an update-rate calculation means for calculating an update rate of the policy based on the reward; and
 an update means for updating the policy based on the update rate.

An optimization method according to a second aspect of the present disclosure, the method performed by a computer includes:
 determining one or more execution policies from a predetermined policy in an objective function having diminishing marginal utility and convexity;
 acquiring a reward, the reward being an execution result in the objective function for the determined execution policy;
 calculating an update rate of the policy based on the reward; and
 updating the policy based on the update rate.

An optimization program according to a third aspect of the present disclosure, the program causes a computer to execute:
 a determination process of determining one or more execution policies from a predetermined policy in an objective function having diminishing marginal utility and convexity;
 a reward acquisition process of acquiring a reward, the reward being an execution result in the objective function for the determined execution policy;
 an update-rate calculation process of calculating an update rate of the policy based on the reward; and
 an update process of updating the policy based on the update rate.

Advantageous Effects of Invention

According to the present invention, it is possible to provide an optimization apparatus, an optimization method, and an optimization program machine that achieve highly accurate optimization for a submodular function when a policy is optimized without preparing data for learning.

DESCRIPTION OF EMBODIMENTS

Figure 1:
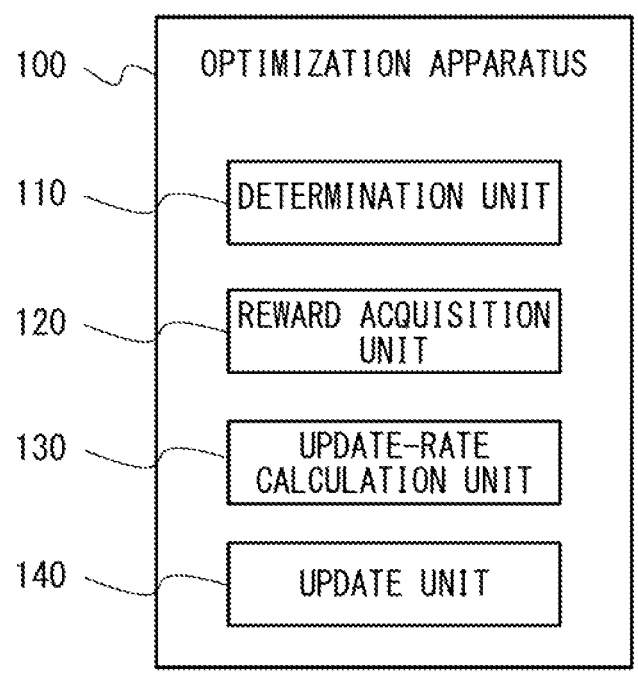
FIG. 1 is a block diagram showing a configuration of an optimization apparatus according to a first example embodiment.

Embodiments in the present disclosure will be described hereinafter in detail with reference to the drawings. The same or corresponding elements are denoted by the same reference signs in the drawings, and duplicated explanations are omitted as necessary for the sake of clarity.

First Example Embodiment

FIG. 1 is a block diagram showing a configuration of an optimization apparatus 100 according to a first example embodiment. The optimization apparatus 100 is an information processing apparatus that performs image segmentation, learning with structured normalization, and submodular function minimization (SFM) including price optimization. Here, a submodular function is a function shown in Expression 1 defined on a subset of a known finite set $[n]:=\{1, 2, \ldots, n\}$ and satisfying the following inequality (1) shown in Expression 2.

$$f:2^{(2)} \to \mathbb{R} \quad \text{[Expression 1]}$$

[Expression 2]

$$f(X)+f(Y) \geq f(X \cap Y)+f(X \cup Y) \quad (1)$$

This condition is equal to the following Expression 3, which is a characteristic of diminishing marginal returns and diminishing marginal utility.

$$X \subseteq Y \subseteq [n] \text{ and } i \in [n] \setminus Y, f(X \cup \{i\}) - f(X) \geq f(Y \cup \{i\}) - f(Y) \quad \text{[Expression 3]}$$

Thus, the submodular function can be said to be a function having diminishing marginal utility.

The optimization apparatus 100 includes a determination unit 110, a reward acquisition unit 120, an update-rate calculation unit 130, and an update unit 140. The determination unit 110 determines one or more execution policies from a predetermined policy in an objective function having diminishing marginal utility and convexity. The reward acquisition unit 120 acquires a reward, which is an execution result in the objective function for the determined execution policy. The update-rate calculation unit 130 calculates an update rate of the policy based on the reward. The update unit 140 updates the policy based on the update rate.

Figure 2:
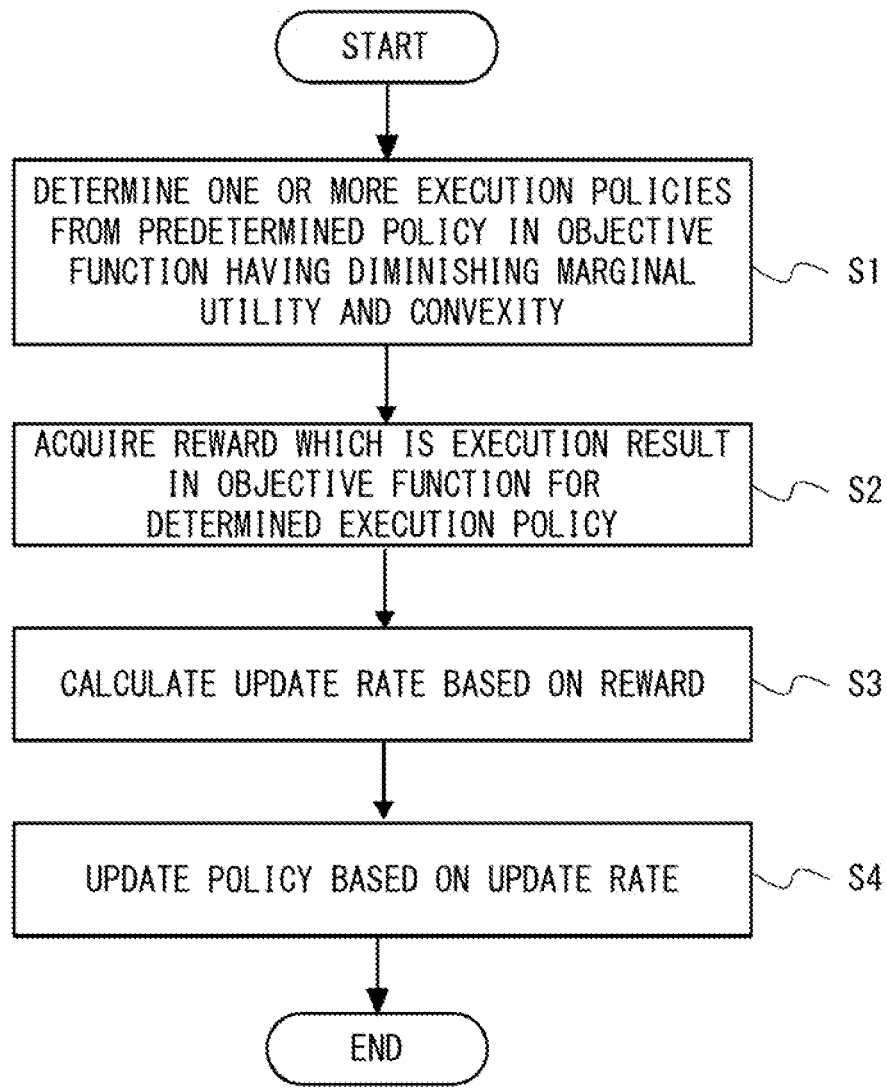
FIG. 2 is a flowchart showing a procedure of an optimization method according to the first example embodiment.

FIG. 2 is a flowchart showing a procedure of an optimization method according to the first example embodiment. First, the determination unit 110 determines one or more execution policies from a predetermined policy in an objective function having diminishing marginal utility and convexity (S1). The reward acquisition unit 120 acquires a reward, which is an execution result in the objective function for the determined execution policy (S2). The update-rate calculation unit 130 calculates an update rate of the policy based on the reward (S3). The update unit 140 updates the policy based on the update rate (S4).

By updating the policy in this manner, it is possible to determine an optimal policy without using past data. Thus, it is possible to achieve highly accurate optimization for a submodular function.

Note that, the optimization apparatus 100 includes a processor, a memory, and a storage device that are not illustrated. In addition, the storage device stores a computer program implementing processes of the optimization method according to the present example embodiment. Then, the processor loads the computer program from the storage device into the memory and executes the computer program. Accordingly, the processor performs the functions of the determination unit 110, the reward acquisition unit 120, the update-rate calculation unit 130, and the update unit 140.

Alternatively, each of the determination unit 110, the reward acquisition unit 120, the update-rate calculation unit 130, and the update unit 140 may be implemented by dedicated hardware. In addition, a part or all of each constituent element of each apparatus may be implemented by a general-purpose or dedicated circuitry, a processor, or the like or a combination thereof. These may be configured by a single chip or a plurality of chips connected via a bus.

A part or all of each constituent element of each apparatus may be implemented by a combination of the circuitry or the like described above and a program. In addition, as a processor, a central processing unit (CPU), a graphics processing unit (GPU), a field-programmable gate array (FPGA) or the like can be used.

If a part or all of each constituent element of the optimization apparatus 100 is implemented by a plurality of information processing apparatuses, circuitries, or the like, the plurality of information processing apparatuses, circuitries, or the like may be collectively or dispersedly arranged. For example, the information processing apparatuses, circuitries, or the like may be implemented by being connected with each other via a communication network, such as a client server system or a cloud computing system. In addition, the function of the optimization apparatus 100 may be provided in a form of Software as a Service (SaaS).

Second Example Embodiment

Here, in some applications, exact evaluation oracles are not always available, but function values containing noise can be observed. For example, in a price optimization problem, it is assumed to consider selling n-types of products. Here, the value of an objective function f(X) corresponds to the expected overall profit, and a variable $X \subseteq [n]$ corresponds to a set of discounted products.

In this scenario, Non Patent Literature 2 discloses that −f(X) is a submodular function in a certain assumption. Here, the problem of maximizing the overall profit f(X) means an example of Submodular function minimization (SFM).

However, in a practical situation, no explicit expression for f is given, and only the sales of products can be observed while the price changes. The observed overall profit does not match its expected value f(X) but varies randomly due to the inherent randomness of buying behavior or any transient event. This means that the exact value of f(X) is not available. For this reason, existing studies cannot be directly applied to this situation.

In order to cope with such a problem, SFM using a noise-including evaluation oracle that returns a random value using the expected value f(X) is proposed in the present disclosure. In other words, a noise-including evaluation oracle f~ is f~(X)=f(X)+ξ, where ξ is the zero-mean noise, which may or may not depend on X.

It is assumed to access to noise-including evaluation oracles f~$_1$, f~$_2$, . . . , f~$_T$, which have a bounded range and are independent from T. In the present disclosure, the case of using a single-point feedback setting and the case of using a more general multiple-point feedback (or k-point feedback) setting are described. In the former setting, for each t∈[T], a feed is selected from one query Xt to f~t to obtain the feedback to f~t(Xt). In the latter setting, an integer k is given, and k queries are selected for each t to feed f~t, and k real numbers of the feedback are observed. Note that, even if its expected value is submodular, each f~t does not necessarily have to be submodular.

<Problem Setting>

It is assumed that n is a natural number (positive integer) and that a finite set of natural numbers at the largest n is $[n]=\{1, 2, \ldots, n\}$. It is assumed that a distributive lattice is $L \subseteq 2^{[n]}$. That is, it is assumed that X and Y∈L imply Expression 4.

$$X \cap Y, X \cup Y \in L \quad \text{[Expression 4]}$$

It is assumed that f:L→[−1, 1] is a submodular function that sets the minimization goal. In this problem setting, access to the exact value of f is not given, but a noise-including evaluation oracle of f shown in Expression 5 is given.

$$\{\hat{f}t\}_{t=1}^{T} \quad \text{[Expression 5]}$$

where, f^t is a random function from L to [−1, 1] that satisfies E[f^t(X)]=f(X) for all of t=1, 2, ... T and X∈L, and E[ ] is an expected value.

The purpose of the present example embodiment is to build an algorithm for solving the following problem. First, the algorithm is given a decision set L and the number for available oracle calls T. For t=1, 2, ... T, the algorithm selects $X_t \in L$ and observes $\hat{f}_t(X_t)$. The selected query $X_t$ can depend on the previous observation value shown in Expression 6.

$$\{\hat{f}_k(X_j)\}_{j=1}^{t-1} \quad \text{[Expression 6]}$$

After T rounds of observation, the algorithm outputs $X^\wedge \in L$. This problem is referred to as a single-point feedback setting.

In a multiple-point or k-point feedback setting, which is another problem setting, a parameter k≥2 is given in addition to T and L. In the k-point feedback setting, the algorithm selects k queries $X_t^{(1)}, X_t^{(2)}, \ldots,$ and $X_t^{(k)} \in L$, then observes the values $\hat{f}_t(X_t^{(1)}), \hat{f}_t(X_t^{(2)}), \ldots,$ and $\hat{f}_t(X_t^{(k)})$ from the evaluation oracle in each round t ∈ T. In both settings, the performance of the algorithm is evaluated for the period of an additive error $E_T$ defined as Expression 7.

$$E_T = f(\hat{X}) - \min_{X \in L} f(X) \quad \text{[Expression 7]}$$

A part of the result depends on the following Assumption 1. Note that, the following is assumed only when explicitly mentioned.

<Assumption 1> Each $\hat{f}_t:L \to [-1, 1]$ is Submodular and k≥2

Here, the first half of Assumption 1 indicates that the output value of the objective function is a submodular function even when it includes noise. This point can be arbitrarily determined by a user. The second half of Assumption 1 indicates that a plurality of policies can be simultaneously executed, that is, it is the k-point feedback.

<Lovász Extension of Submodular Function>

For a vector $x=(x1, \ldots, xn)^T \in [0, 1]^d$ of the value [0, 1] and a real number value u∈[0, 1], a set of indices i for $x_i \geq u$ is defined as $H_x(u) \subseteq [n]$.

That is, this is expressed as Expression 8.

$$H_x(u) = \{i \in [n] | x_i \geq u\} \quad \text{[Expression 8]}$$

The distributive lattice L is expressed as Expression 9, and the convex hull of L is defined as Expression 10.

$$\tilde{L} = \{x \subseteq [0,1]^n | H_x(u) \in L \text{ for all } u \in [0,1]\} \quad \text{[Expression 9]}$$

$$\tilde{L} \subseteq [0,1]^n \quad \text{[Expression 10]}$$

If the function f:L→R is given, the Lovász extension of f (Expression 11) is defined as the following (2) shown in Expression 12.

$$\tilde{f}:\tilde{L} \to \mathbb{R} \quad \text{[Expression 11]}$$

[Expression 12]

$$\tilde{f}(x) = \int_0^1 f(H_x(u)) du \quad (2)$$

From this definition, all X∈L is expressed as Expression 13.

$$\tilde{f}(\chi X) = f(X) \quad \text{[Expression 13]}$$

That is, Expression 14 is the extension of f.

$$\tilde{f} \quad \text{[Expression 14]}$$

The following theorem provides a connection between the submodular function and the convex function.

<Theorem 1>

If and only if Expression 15 is convex, the function f:L→ is submodular.

$$\tilde{f} \quad \text{[Expression 15]}$$

The submodular function f:L→R is the following Expression 16.

$$\min_{X \in L} f(x) = \min_{x \in \tilde{L}} \tilde{f}(x) \quad \text{[Expression 16]}$$

For x∈[0, 1], a permutation function on [n] such as $x_{\sigma(1)} \geq x_{\sigma(2)} \geq \ldots \geq x_{\sigma(n)}$ is assumed to be σ:[n]→[n]. In addition, $S_\sigma(i) = \{\sigma(j) | j \leq i\}$ is defined for any permutation on [n]. Lovász extension defined by (2) can be rewritten as the following (3) shown in Expression 17 and (4) shown in Expression 18.

[Expression 17]

$$\tilde{f}(x) = f([0]) + \sum_{i=1}^{n} (f(S_\sigma(i)) - f(S_\sigma(i-1))) x_{\sigma(i)} \quad (3)$$

[Expression 18]

$$\tilde{f}(x) = f([0])(1 - x_{\sigma(1)}) + \sum_{i=1}^{n} f(S_\sigma(i))(x_{\sigma(i)} - x_{\sigma(i+1)}) + f([n]) x_{\sigma(n)} \quad (4)$$

<Subgradient of Lovász Extension>

From the above two Lovász extension expressions of (3) and (4), two alternative ways to express its subgradient is obtained. The permutation function σ and i∈{0, 1, ..., n} on [n] are defined as $\Psi_{\sigma(i)} \subseteq \{-1, 0, 1\}^n$ as in the following (5) shown in Expression 19.

[Expression 19]

$$\Psi_\sigma(0) = -\chi_{\sigma(1)}, \Psi_\sigma(n) = \chi_{\sigma(n)}, \quad (5)$$

$$\Psi_\sigma(i) = \chi_{\sigma(i)} - \chi_{\sigma(i+1)} (i = 1, 2, \ldots, n-1)$$

The subgradient of Expression 20 at x can be expressed by $g(\sigma_x)$ defined as the following (6) shown in Expression 21 and (7) shown in Expression 22. Here, (6) and (7) are derived from (3) and (4), respectively.

$$\tilde{f} \quad \text{[Expression 20]}$$

[Expression 21]

$$g(\sigma) := \sum_{i=1}^{n} (f(S_\sigma(i)) - f(S_\sigma(i-1))) \chi_{\sigma(i)} \quad (6)$$

[Expression 22]

$$g(\sigma) = -f([0]) \chi_{\sigma(i)} + \sum_{i=1}^{n-1} \left( f(S_\sigma(i))(\chi_{\sigma(i)} - \chi_{\sigma(i+1)}) + f([n]) \chi_{\sigma(n)} = \sum_{i=0}^{n} f(S_\sigma(i)) \Psi_\sigma(i) \right) \quad (7)$$

<Configuration of Optimization Apparatus>

Figure 3:
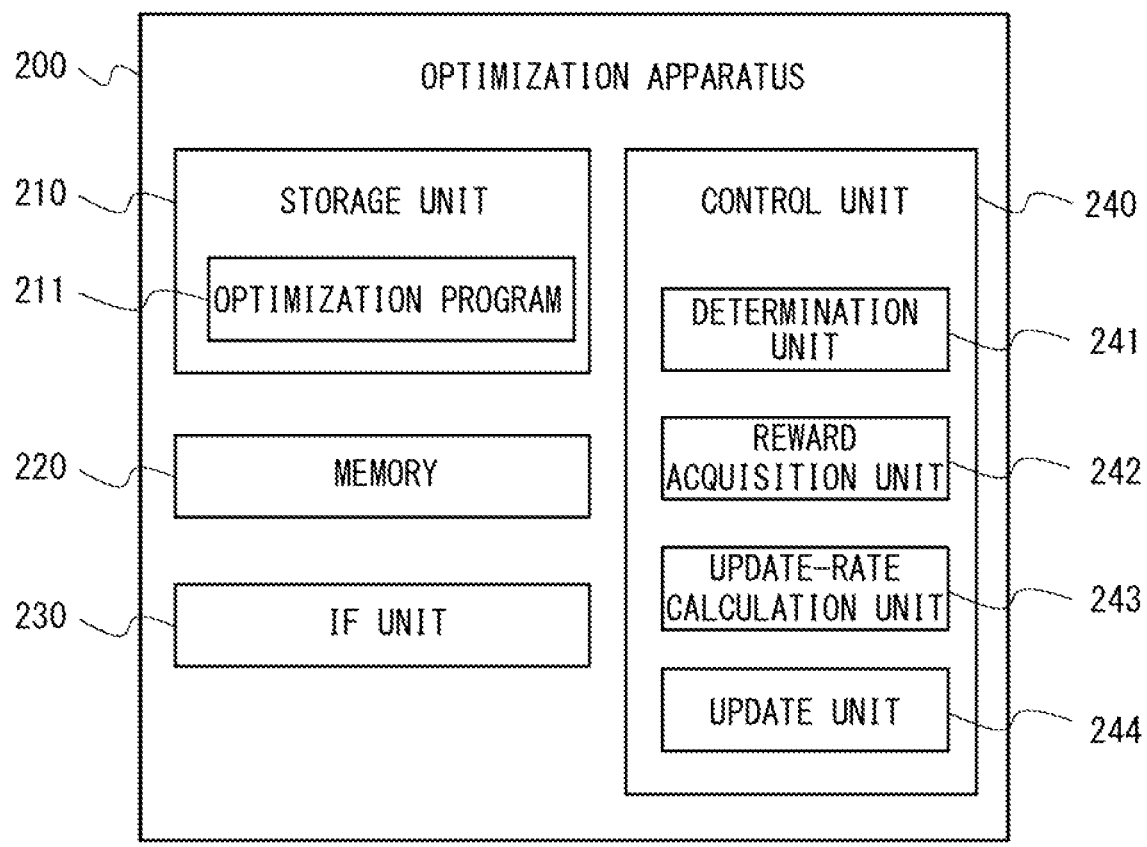
FIG. 3 is a block diagram showing a configuration of an optimization apparatus according to a second example embodiment.

FIG. 3 is a block diagram showing a configuration of an optimization apparatus 200 according to a second example embodiment. The optimization apparatus 200 is an information processing apparatus that is a concrete example of the optimization apparatus 100. The optimization apparatus 200 includes a storage unit 210, a memory 220, an interface (IF) unit 230, and a control unit 240.

The storage unit 210 is a storage device such as a hard disk or a flash memory. The storage unit 210 stores at least an optimization program 211. The optimization program 211 is a computer program implementing an optimization method according to the present example embodiment.

The memory 220 is a volatile storage device such as a random access memory (RAM) and is a storage area for temporarily holding information while the control unit 240 operates. The IF unit 230 is an interface that performs input/output to/from the outside of the optimization apparatus 200. For example, the IF unit 230 accepts input data from other computers or the like via a network (not shown) and outputs the accepted input data to the control unit 240. The IF unit 230 further outputs, in response to an instruction from the control unit 240, data to a transmission destination computer via the network. Alternatively, the IF unit 230 accepts a user's operation via an input device (not shown) such as a keyboard, a mouse, or a touch panel and outputs the accepted operation to the control unit 240. In addition, the IF unit 230 outputs, in response to an instruction from the control unit 240, to a touch panel, a display device, or a printer (not shown).

The control unit 240 is a processor such as a central processing unit (CPU) and controls each unit of the optimization apparatus 200. The control unit 240 loads the optimization program 211 from the storage unit 210 into the memory 220 to execute the optimization program 211. Accordingly, the control unit 240 performs the functions of a determination unit 241, a reward acquisition unit 242, an update-rate calculation unit 243, and an update unit 244. Note that, the determination unit 241, the reward acquisition unit 242, the update-rate calculation unit 243, and the update unit 244 are examples of the determination unit 110, the reward acquisition unit 120, the update-rate calculation unit 130, and the update unit 140, respectively.

The determination unit 241 acquires, from a plurality of element values included in a predetermined policy, a predetermined number of values in descending order and determines a set of the acquired element values as an execution policy. For example, the determination unit 241 permutes a set of policies for a predetermined objective function and determines, depending on whether Assumption 1 is satisfied or not, one or more execution policies from the set of the policies. For example, when Assumption 1 is satisfied, the determination unit 241 determines a subset of two or more execution policies. On the other hand, when Assumption 1 is not satisfied, the determination unit 241 determines a subset of one execution policy. Here, the objective function is, for example, a function (in which policies are continuous values) having convexity subjected to Lovász-extension from a submodular function f in which policies are discontinuous values.

The reward acquisition unit 242 acquires a reward that is an execution result in the objective function for the determined execution policy. For example, the reward acquisition unit 242 gives the set of the determined execution policy to the noise-including evaluation oracle to acquire a reward as an execution result. In particular, the reward acquisition unit 242 acquires two or more rewards using the determined two or more execution policies.

The update-rate calculation unit 243 calculates a policy update rate based on the reward. In particular, the update-rate calculation unit 243 calculates an update rate using the two or more rewards. In addition, it is desirable that the update-rate calculation unit 243 calculates an update rate based on the difference between the two or more rewards.

The update unit 244 updates the policy based on the update rate.

Note that, the details of the above described processes are included in the following description of the flowchart.

<Procedure of Optimization Method>

Figure 4:
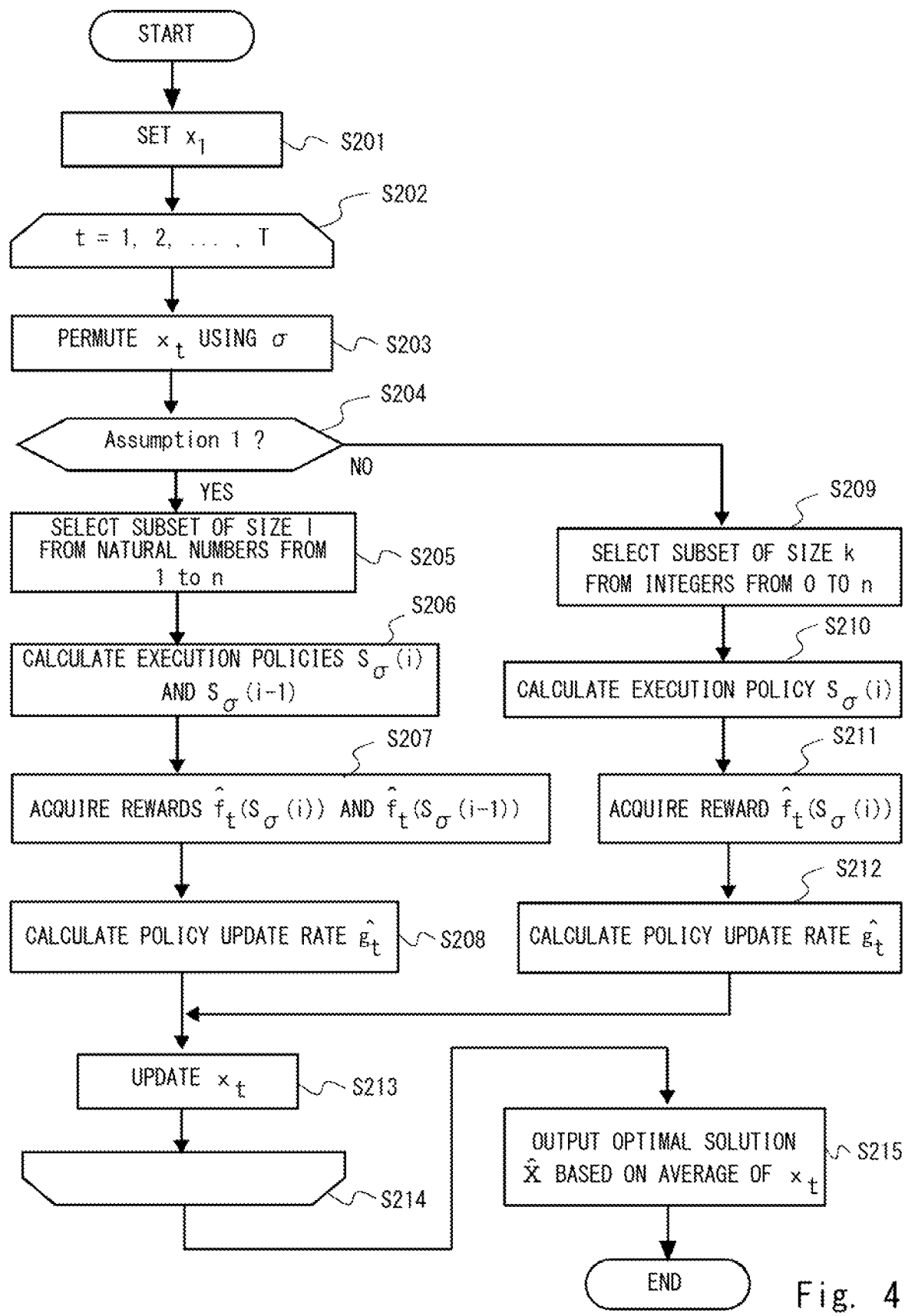
FIG. 4 is a flowchart showing a procedure of an optimization method according to the second example embodiment.

FIG. 4 is a flowchart showing a procedure of an optimization method according to the second example embodiment. First, as preconditions, it is assumed that the size of a problem is size n≥1, the number of oracle calls is T≥1, the number of feedback values per oracle call is k∈[n+1], and learning rate is η>0. In addition, it is assumed that the user can arbitrarily change the setting for whether the above Assumption 1 is satisfied or not (function conditions and the value of k). This algorithm is based on the stochastic gradient descent for Expression 23.

$$\hat{f}:\hat{L} \to [0,1] \quad \text{[Expression 23]}$$

First, the control unit 240 sets an initial policy vector as Expression 24 (S201).

$$x_1 = \frac{1}{2} \cdot 1 \in \hat{L} \quad \text{[Expression 24]}$$

where, the vector "1" has n element values, each of which is 1. That is, the policy vector $x_1$ is an n-dimensional vector in which each element value is ½.

Next, the control unit 240 adds t by 1 from round t=1 to T and repeats the following steps S203 to S213 (S202).

First, the determination unit 241 permutes, using the above permutation function σ:[n]→[n], the element values of the policy vector $x_t$ to be $x_{t\sigma(1)} \geq \ldots \geq x_{t\sigma(n)}$ (S203). That is, the permutation function a permutes the element values of the policy vector $x_t$ in descending order.

Next, the determination unit 241 determines whether the above Assumption 1 is satisfied or not (S204). When it is determined that Assumption 1 is not satisfied in step S204, for example, if k∈[n+1] includes noise and is not the submodular function or in the case of k=1, steps S209 to S212 are performed.

The determination unit 241 randomly selects a subset $I_t$ of size k from integers from 0 to n (S209). Here, the subset $I_t$ is defined by Expression 25, and follows the uniform distribution on the subset family {I⊆{0, 1, . . . , n}∥I∣=k}.

$$I_t = \{i_t^{(j)}\}_{j=1}^k \subseteq \{0,1,\ldots,n\} \quad \text{[Expression 25]}$$

Next, the determination unit 241 calculates an execution policy based on the following Expression 26 (S210).

$$X_t^{(j)} = S_\sigma(i_t^{(j)}) = \{\sigma(j) | j \leq i_t^{(j)}\} \quad \text{[Expression 26]}$$

That is, the determination unit 241 selects $i_t^{(j)}$ element values from the policy vector $x_t$ in descending order of the element values and determines them as a set $X_t^{(j)}$ of execution policies, that is, as $S_\sigma(i_t^{(j)})$. Here, Sσ(i) is a function for selecting i element values from the permuted element values of the policy vector $x_t$ in descending order to form a set. Note that, Sσ(i) can also be said to select the following random query shown in Expression 27.

$$\{X_t^{(j)}\}_{j=1}^k \quad \text{[Expression 27]}$$

Then, the reward acquisition unit 242 observes Expression 28 and acquires it as a reward (S211).

$$\hat{f}_t(S_\sigma(i)) \qquad \text{[Expression 28]}$$

That is, the reward acquisition unit 242 calls the noise-including evaluation oracle f^ to observe Expression 29.

$$\hat{f}_t(X_t^{(j)}) \qquad \text{[Expression 29]}$$

Thereafter, the update-rate calculation unit 243 calculates a policy update rate g^$_t$ with the following (8) shown in Expression 30.

[Expression 30]

$$\hat{g}_t = \frac{n+1}{k} \sum_{j=1}^{k} \hat{f}_t(X_t^{(j)}) \Psi_\sigma(i_t^{(j)}) = \frac{n+1}{k} \sum_{i \in J_t} \hat{f}_t(S_\sigma(i)) \Psi_\sigma(i) \qquad (8)$$

where, $\Psi_\sigma(i)$ is defined by the above (5). Then, g^$_t$ is the unbiased estimator of the subgradient and satisfies Expression 31.

$$E[\|\hat{g}_t\|_2^2] = O(n^2/k) \qquad \text{[Expression 31]}$$

<Auxiliary Theorem 1>

It is assumed that g^t is given by the above (8). Then, g^t satisfies the following (9) shown in Expression 32.

[Expression 32]

$$E[\hat{g}|x_t] \in \partial \tilde{f}(x_t), E[\|\hat{g}_t\|_2^2] \leq 2(n+1)(n+k)/k \qquad (9)$$

On the other hand, when it is determined that Assumption 1 is satisfied in step S204, that is, in the case of the submodular function in the noise-including evaluation oracle and 2≤k(≤n+1), steps S205 to S207 are performed.

First, the determination unit 241 randomly selects a subset J$_t$ of size l from natural numbers from 1 to n (S205). Here, size l is the largest integer of k/2 or less and expressed as the following Expression 33.

$$l = \lfloor k/2 \rfloor \geq 1 \qquad \text{[Expression 33]}$$

For example, in the case of k=2 or 3, any one of natural numbers from 1 to n is selected for the subset J$_t$. In the case of k=4, any two of natural numbers from 1 to n are selected for the subset J$_t$.

Next, the determination unit 241 calculates an execution policy based on the following (S206). That is, to satisfy Expression 34, a query shown in Expression 35 is selected.

$$\cup_{i \in J_t} \{S_\sigma(i), S_\sigma(i-1)\} \subseteq \{X_t^{(j)}\}_{j=1}^{k} \qquad \text{[Expression 34]}$$

$$\{X_t^{(j)}\}_{j=1}^{k} \qquad \text{[Expression 35]}$$

In other words, the determination unit 241 determines a set $S_\sigma(i)$ of execution policies for which i element values are selected from the policy vector $x_t$ in descending order of the element values, and a set $S_\sigma(i-1)$ of execution policies for which i−1 element values are selected from the policy vector $x_t$ in descending order of the element values as execution policies.

Then, the reward acquisition unit 242 observes, for i∈Jt, Expression 36 and Expression 37 and acquires them as rewards (S207).

$$\hat{f}_t(S_\sigma(i)) \qquad \text{[Expression 36]}$$

$$\hat{f}_t(S_\sigma(i-1)) \qquad \text{[Expression 37]}$$

That is, the reward acquisition unit 242 calls the noise-including evaluation oracle f^ to observe them.

Thereafter, the update-rate calculation unit 243 calculates a policy update rate g^$_t$ with the following (10) shown in Expression 38.

[Expression 38]

$$\hat{g}_t = \frac{n}{l} \sum_{i \in J_t} (\hat{f}_t(S_\sigma(i)) - \hat{f}_t(S_\sigma(i-1))) \chi_{\sigma(i)} \qquad (10)$$

Then, g^t is the unbiased estimator of the subgradient and satisfies Expression 39.

$$E[\|\hat{g}_t\|_2^2] = O(n^2/k) \qquad \text{[Expression 39]}$$

If Expression 40 is a submodular function, Expression 41 is retained.

$$\hat{f}_t \qquad \text{[Expression 40]}$$

$$E[\|\hat{g}_t\|_2^2] = O(n/k) \qquad \text{[Expression 41]}$$

<Auxiliary Theorem 2>

It is assumed that g^$_t$ is given by the above (10). Then, it satisfies the following (11) shown in Expression 42.

[Expression 42]

$$E[\hat{g}_t|x_t] \in \partial \tilde{f}(x_t), E[\|\hat{g}_t\|_2^2] \leq 4n^2/l \leq 12n^2/k \qquad (11)$$

In addition, if f^t is a submodular function, it satisfies the following (12) shown in Expression 43.

[Expression 43]

$$[\|\hat{g}_t\|_2^2] \leq 16n/l \leq 48n/k \qquad (12)$$

After step S208 or S212, the update unit 244 updates $x_t$ with the following Expression 44 (S213).

$$x_{t+1} = P_{\tilde{L}}(x_t - \eta \hat{g}_t) \qquad \text{[Expression 44]}$$

Here, Expression 45 indicates the euclidean projection to Expression 46 and is Expression 47.

$$P_{\tilde{L}} : \mathbb{R}^n \to \tilde{L} \qquad \text{[Expression 45]}$$

$$\tilde{L} \qquad \text{[Expression 46]}$$

$$P_{\tilde{L}}(x) \in \arg\min_{y \in \tilde{L}} \|y - x\|_2 \qquad \text{[Expression 47]}$$

Then, η>0 is a parameter that can be varied arbitrarily.

Thereafter, the control unit 240 determines whether the round t equals T (S214) and returns to step S202 when t is less than T to perform t=t+1 and performs step S203 and subsequent steps. When t equals T in step S214, the control unit 240 calculates the average $\bar{x}$ of x with the following Expression 48.

$$\bar{x} = \frac{1}{T} \sum_{t=1}^{T} x_t \qquad \text{[Expression 48]}$$

Then, the control unit 240 randomly selects u from the uniform distribution on [0, 1] and calculates an optimal solution X^ based on the following Expression 49.

$$\hat{X} = H_{\bar{x}}(u) = \text{[Expression 49]}$$

Thereafter, the control unit 240 outputs the optimal solution X^. That is, the control unit 240 outputs the optimal solution X^ based on the average of $x_t$ (S215). Thereafter, this optimization processing is completed. Here, the following Expression 50 holds from the above (2).

$$E[f(k)] = E[\tilde{f}(\bar{x})] \qquad \text{[Expression 50]}$$

Subsequently, the following theorem is used to analyze the performance of this algorithm.
<Theorem 2>
It is assumed that a compact convex set containing 0 is $D \in \mathbb{R}^n$. It is assumed that the convex function shown in Expression 51 is $x_1, \ldots, x_T$ defined by $x_1 = 0$ and $x_{t+1} = P_D (x_t - \eta \hat{g}^t)$.

$$\tilde{f} : D \to \mathbb{R} \qquad \text{[Expression 51]}$$

where, $E[\hat{g}^t|xt]$ is the subgradient of Expression 52 at $x_t$ for each t.

$$\tilde{f} \qquad \text{[Expression 52]}$$

Then, Expression 53 satisfies (13) shown in Expression 54.

$$\bar{x} := \frac{1}{T} \sum_{t=1}^{T} x_t \qquad \text{[Expression 53]}$$

[Expression 54]

$$E[\tilde{f}(\bar{x})] - \min_{x^* \in D} \tilde{f}(x^*) \le \frac{1}{T}\left(\frac{\max_{x \in D}\|x\|_2^2}{2\eta} + \frac{\eta}{2}\sum_{t=1}^{T}E[\|\hat{g}_t\|_2^2]\right) \qquad (13)$$

<Effects>
The present disclosure has the following effects.
<Theorem 3>
It is assumed to be $1 \le k \le n+1$. For a problem using a k-point feedback, there is an algorithm such as (14) shown in Expression 55 that returns $X^{\wedge}$.

[Expression 55]

$$E[E_T] = E[f(\hat{X})] - \min_{X \in L} f(X) = O(n^{3/2}/\sqrt{kT}) \qquad (14)$$

If Assumption 1 is maintained, there is an algorithm such as (15) shown in Expression 56 that returns $X^{\wedge}$.

[Expression 56]

$$E[E_T] = E[f(\hat{X})] - \min_{X \in L} f(X) = O(n/\sqrt{kT}) \qquad (15)$$

The expected value is obtained with respect to the randomness of the oracle $\hat{f}_t$ and the internal randomness of the algorithm. In both algorithms, the execution time is reduced (bounded) by $O((kEO + n \log n)T)$. Where, EO is expressed as the time obtained by the evaluation oracle answering a single query.

If the number of oracle calls T is arbitrarily selected, an algorithm using error bound (14) can calculate an approximate solution (in an expected value) in F addition for any $\varepsilon > 0$. The calculation time for it is Expression 57.

$$O\left(\frac{n^3}{\varepsilon^2}\left(EO + \frac{n}{k}\log n\right)\right) \qquad \text{[Expression 57]}$$

In fact, in order to find an approximate solution in $\varepsilon$ addition, a set T is satisfied as in Expression 58, which is equivalent to Expression 59.

$$\varepsilon = \Theta\left(\frac{n^{3/2}}{\sqrt{kT}}\right) \qquad \text{[Expression 58]}$$

$$T = \Theta\left(\frac{n^3}{k\varepsilon^2}\right) \qquad \text{[Expression 59]}$$

The calculation time is reduced as shown in Expression 60.

$$O((kEO + n\log n)T) = O\left(\frac{n^3}{\varepsilon^2}\left(EO + \frac{n}{k}\log n\right)\right) \qquad \text{[Expression 60]}$$

Similarly, if Assumption 1 is maintained and the algorithm that achieves the above (15) is used, the approximate solution in F addition can be searched in the time shown in Expression 61.

$$O\left(\frac{n^2}{\varepsilon^2}\left(EO + \frac{n}{k}\log n\right)\right) \qquad \text{[Expression 61]}$$

In Non Patent Literature 1, Expression 62 holds in a single-point feedback setting.

$$O\left(\frac{n}{T^{1/3}}\right) \quad (\text{if } T = \Omega(n^3)) \qquad \text{[Expression 62]}$$

However, in the present disclosure, Expression 63 holds.

$$O\left(\frac{n^{3/2}}{\sqrt{T}}\right) \text{ and } \Omega'\left(\frac{n}{\sqrt{T}}\right) \quad (\Omega'(\cdot)) := \Omega(\min\{1, \cdot\}) \qquad \text{[Expression 63]}$$

In the present disclosure, assuming that $\hat{f}_t$ is the submodular function in a k-point feedback setting, Expression 64 holds.

$$O\left(\frac{n}{\sqrt{kT}}\right) \text{ and } \Omega'\left(\frac{n}{\sqrt{2^k T}} + \frac{\sqrt{n}}{\sqrt{T}}\right) \qquad \text{[Expression 64]}$$

Next, examples 2-1 to 2-3 according to the present second example embodiment are described.

Example 2-1

The present example 2-1 describes a case where the optimization apparatus is applied to a price optimization problem when cannibalization can occur depending on how prices are set among competing products. In this case, it is assumed that the above objective function uses, as input, a set of discount policies for each of a plurality of products as the execution policy determined in the above second example embodiment, and outputs a payout amount of each product based on the cannibalization among the plurality of products.

Here, beers are taken as examples of competing products. Then, it is assumed that a policy is a discount on the price of each company's beer at a certain store. For example, when the execution policy X21=[0, 2, 1, . . . ] is set, the first element indicates that the beer price of a company A is the fixed price, the second element indicates that the beer price of a company B is 10% higher than the fixed price, and the third element indicates that the beer price of a company C is 10% discounted from the fixed price. Then, the objective function uses, as input, the execution policy X21 and outputs a result of the sales by applying the execution policy X21 to the beer price of each company. In this case, by applying the optimization method according to the second example embodiment, it is possible to derive the optimal price setting for the beer price of each company at the store without using past history.

Example 2-2

This example 2-2 describes a case where the optimization apparatus is applied to investment behavior of investors or the like. In this case, it is assumed that the execution policies are investment (purchasing, capital increase), sales, holding of a plurality of financial instruments (stocks or the like) held or to be held by investors. For example, when the execution policy X22=[1, 0, 2, . . . ] is set, the first element indicates additional investment in the shares of a company A, the second element indicates holding the claims of a company B (not purchasing or selling), and the third element indicates sale of the shares of a company C. Then, the objective function uses, as input, the execution policy X22 and outputs the result of applying the execution policy X to investment behavior in each company's financial instruments. In this case, by applying the optimization method according to the above second example embodiment, it is possible to derive the investors' optimal investment behavior in each stock without using past history.

Example 2-3

This example 2-3 is, as the case of k=2, a price optimization apparatus that dynamically changes product prices in, for example, electronic commerce depending on customers. In this case, first, it is assumed that a price set for a product set at a certain of an electronic commerce site is an execution policy X23. Then, the objective function uses, as input, the execution policy X23 and outputs the profit from the sale of each product during a predetermined period of time as a reward. At this time, the price optimization apparatus determines a price set to be proposed to a customer A as an execution policy X23-1 (corresponding to $S_o(i)$) and a price set to be proposed to a customer B as an execution policy X23-2 (corresponding to $S_o(i-1)$). Then, the price optimization apparatus performs the execution policy X23-1 for the customer A and simultaneously performs the execution policy X23-2 for the customer B. That is, the price optimization apparatus changes and proposes a product price for each customer. As a result, the price optimization apparatus acquires a "reward" from each of the customers A and B. Updating the next execution policies with these rewards can be said that the optimization method is applied in k=2 in the above second example embodiment. Thus, this price optimization apparatus can derive an optimal price setting for each customer in the certain shop of the electronic commerce site.

Other Example Embodiments

The present disclosure is described as a hardware configuration in the above example embodiments but is not limited thereto. The present disclosure can be achieved by a central processing unit (CPU) executing a computer program for any processing.

In the above examples, the program can be stored and provided to a computer using any type of non-transitory computer-readable media. Non-transitory computer-readable media include any type of tangible storage media.

Examples of non-transitory computer readable-media include magnetic storage media (such as flexible disks, magnetic tapes, hard disk drives, etc.), optical magnetic storage media (such as magneto-optical disks), Compact Disc Read Only Memory (CD-ROM), CD-R, CD-R/W, Digital Versatile Disc (DVD), and semiconductor memories (such as mask ROM, Programmable ROM (PROM), Erasable PROM (EPROM), flash ROM, Random Access Memory (RAM), etc.).

The program may be provided to a computer using any type of transitory computer-readable media. Examples of transitory computer-readable media include electric signals, optical signals, and electromagnetic waves. Transitory computer-readable media can provide the program to a computer via a wired communication line (such as electric wires and optical fibers) or a wireless communication line.

Note that, the present disclosure is not limited to the above example embodiments and can be modified without departing from the gist thereof. In addition, the present disclosure may be implemented by combining the example embodiments as appropriate.

The whole or part of the above example embodiments can be described as, but not limited to, the following Supplementary notes.

(Supplementary Note A1)
An optimization apparatus comprising:
a determination means for determining one or more execution policies from a predetermined policy in an objective function having diminishing marginal utility and convexity;
a reward acquisition means for acquiring a reward, the reward being an execution result in the objective function for the determined execution policy;
an update-rate calculation means for calculating an update rate of the policy based on the reward; and
an update means for updating the policy based on the update rate.

(Supplementary Note A2)
The optimization apparatus according to Supplementary note A1, wherein the objective function uses, as input, a set of discount policies for each of a plurality of products as the execution policy, and outputs a payout amount for each product based on cannibalization among the plurality of products.

(Supplementary Note A3)
The optimization apparatus according to Supplementary note A1 or A2, wherein the determination means acquires a predetermined number of element values in descending order from a plurality of element values contained in the predetermined policy, and determines a set of acquired element values as the execution policy.

(Supplementary Note A4)
The optimization apparatus according to any one of Supplementary notes A1 to A3, wherein
the determination means determines two or more execution policies,
the reward acquisition means acquires two or more of the rewards using the determined two or more execution policies, and
the update-rate calculation means calculates the update rate using the two or more of the rewards.

(Supplementary Note A5)

The optimization apparatus according to Supplementary note A4, wherein the update-rate calculation means calculates the update rate based on a difference between the two or more of the rewards.

(Supplementary Note B1)

An optimization method performed by a computer, the method comprising:

determining one or more execution policies from a predetermined policy in an objective function having diminishing marginal utility and convexity;

acquiring a reward, the reward being an execution result in the objective function for the determined execution policy;

calculating an update rate of the policy based on the reward; and updating the policy based on the update rate.

(Supplementary Note C1)

A non-transitory computer-readable medium storing an optimization program causing a computer to execute:

a determination process of determining one or more execution policies from a predetermined policy in an objective function having diminishing marginal utility and convexity;

a reward acquisition process of acquiring a reward, the reward being an execution result in the objective function for the determined execution policy;

an update-rate calculation process of calculating an update rate of the policy based on the reward; and an update process of updating the policy based on the update rate.

The present invention has been described with reference to the example embodiments (and examples), but is not limited to the example embodiments (and examples). Various modifications that can be understood by those skilled in the art can be made to the configurations and the details of the present invention without departing from the scope of the invention.

REFERENCE SIGNS LIST

100 Optimization apparatus
110 Determination unit
120 Reward acquisition unit
130 Update-rate calculation unit
140 Update unit
200 Optimization apparatus
210 Storage unit
211 Optimization program
220 Memory
230 IF unit
240 Control unit
241 Determination unit
242 Reward acquisition unit
243 Update-rate calculation unit
244 Update unit

What is claimed is:

1. An optimization apparatus to optimize a predetermined policy by minimizing a submodular function, the optimization apparatus comprising:

at least one memory configured to store instructions; and at least one processor configured to execute the instructions to:

determine one or more execution policies from the policy in an objective function having convexity subjected to Lovász-extension from the submodular function;

acquire reward, the reward being an execution result in the submodular function for the determined one or more execution policies;

calculate an update rate of the policy based on the reward; and update the policy based on the update rate, wherein the updated policy achieves higher accuracy for the submodular function.

2. The optimization apparatus according to claim 1, wherein the objective function uses, as input, a set of discount policies for each of a plurality of products as the execution policy, and outputs a payout amount for each product based on cannibalization among the plurality of products.

3. The optimization apparatus according to claim 1, wherein the at least one processor is further configured to execute the instructions to:

acquire a predetermined number of element values in descending order from a plurality of element values contained in the predetermined policy, and determine a set of acquired element values as the execution policy.

4. The optimization apparatus according to claim 1, wherein the at least one processor is further configured to execute the instructions to:

determine two or more execution policies;

acquire two or more of the rewards using the determined two or more execution policies; and calculate the update rate using the two or more of the rewards.

5. The optimization apparatus according to claim 4, wherein the at least one processor is further configured to execute the instructions to:

calculate the update rate based on a difference between the two or more of the rewards.

6. An optimization method performed by a computer, the method to optimize a predetermined policy by minimizing a submodular function, the optimization method comprising:

determining one or more execution policies from the predetermined policy in an objective function having convexity subjected to Lovász-extension from the submodular function;

acquiring a reward, the reward being an execution result in the submodular function for the determined execution policy;

calculating an update rate of the policy based on the reward; and updating the policy based on the update rate, wherein the updated policy achieves higher accuracy for the submodular function.

7. A non-transitory computer-readable medium storing an optimization program to optimize a predetermined policy by minimizing a submodular function, the optimization program, if executed, causing a computer to execute:

a determination process of determining one or more execution policies from the predetermined policy in an objective function having convexity subjected to Lovász-extension from the submodular function;

a reward acquisition process of acquiring a reward, the reward being an execution result in the submodular function for the determined execution policy;

an update-rate calculation process of calculating an update rate of the policy based on the reward; and an update process of updating the policy based on the update rate, wherein the updated policy achieves higher accuracy for the submodular function.

* * * * *